Aug. 20, 1968    L. G. SIMJIAN    3,397,764
ARTICLE DELIVERY SYSTEM
Filed Nov. 30, 1966    3 Sheets-Sheet 1
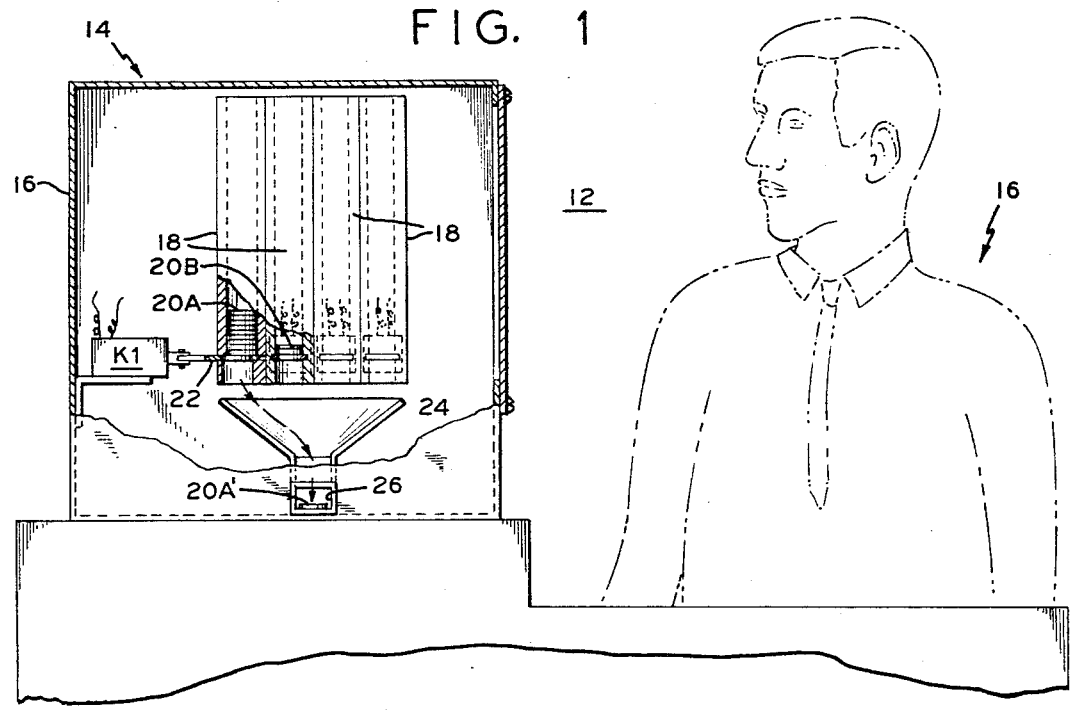
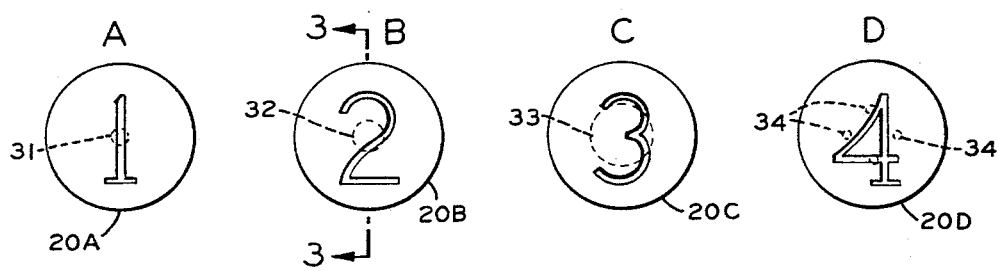
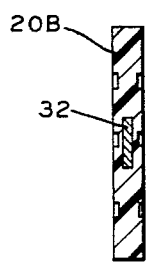
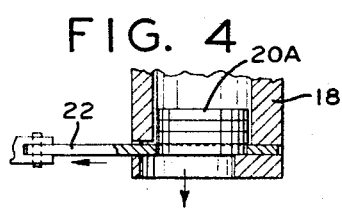
Luther G. Simjian
INVENTOR.
BY:
Erwin B. Steinberg
AGENT.

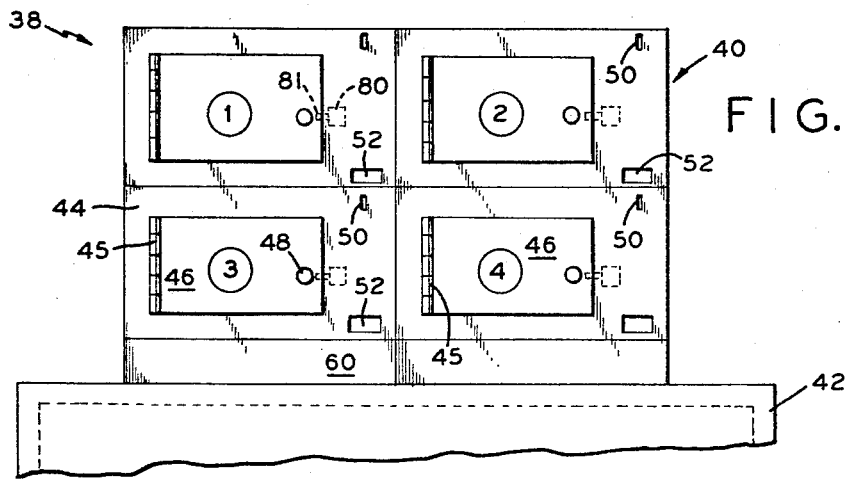
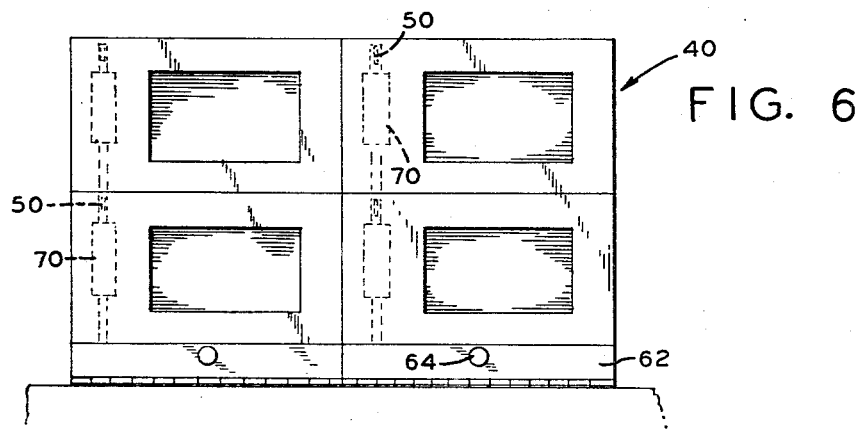
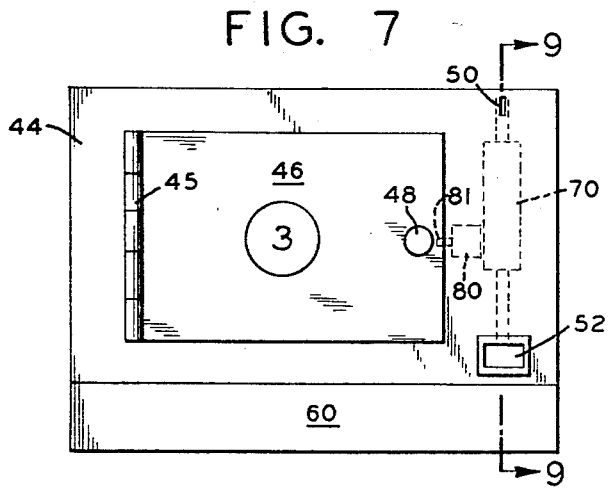
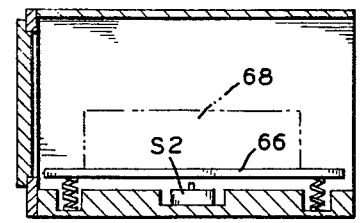

Aug. 20, 1968   L. G. SIMJIAN   3,397,764
ARTICLE DELIVERY SYSTEM
Filed Nov. 30, 1966   3 Sheets-Sheet 3

Luther G. Simjian
INVENTOR.
BY:
Ervin B. Steinberg
AGENT.

United States Patent Office 3,397,764
Patented Aug. 20, 1968

3,397,764
ARTICLE DELIVERY SYSTEM
Luther G. Simjian, Laurel Lane,
Greenwich, Conn. 06830
Filed Nov. 30, 1966, Ser. No. 598,027
12 Claims. (Cl. 194—4)

ABSTRACT OF THE DISCLOSURE

An article delivery system comprising a supervisory station having check storage and dispensing means, and an article delivery station having locked compartments for receiving articles, each compartment being operable for article withdrawal by a respective check issued at the supervisory station. Upon depositing the proper check and withdrawal of the article, the used check is stored and rendered inaccessible, while a new check is available for issuance at the supervisory station.

---

This invention is related to my copending application for U.S. Letters Patent Ser. No. 466,705 filed June 24, 1965 entitled "Service Compartment," now U.S. Patent No. 3,300,016 dated Jan. 24, 1967. It is related, moreover, to my earlier U.S. Patent No. 3,130,395 dated Apr. 21, 1964 entitled "Service Area With Compartments."

The invention refers to an arrangement of service compartments adapted to provide service to a patron or a customer. The compartments are operable by certain predetermined check means, and supervisory means are provided to control the availability of such check means to patrons. The article delivery system disclosed hereafter is particularly useful for issuing cafeteria type meals, but many other articles or combination of articles may be dispensed by the use of this system and no limitation as to use thereof shall be implied.

The concept described hereafter, quite broadly, involves the use of an array of compartments, each compartment being adapted for receiving one or more articles. Typically, the article may comprise a tray having a meal thereupon. The compartment is locked and cannot be opened by the patron until the tray has been deposited in the particular compartment, and the compartment by means of withdrawal control means has been conditioned for article withdrawal. When the compartment is so conditioned, the patron may use a previously issued check to open the compartment and remove the article. Subsequently, the deposited check is rendered inaccessible to the patron using such compartment while, in response to such action, a new check which is adapted to operate the very same compartment is rendered available at a supervisory station for use by a succeeding patron. Hence, the circulation of checks is controlled and only one check associated with a particular compartment is in circulation, although a plurality of such checks are provided within the system.

One of the principal objects of this invention is, therefore, the provision of a new and improved article delivery system.

Another important object of this invention is the provision of an article delivery system which includes compartments, check means for operating the compartments and means for controlling the check means which are in circulation.

Another object of this invention is the provision of an article delivery system which includes a supervisory station and an article delivery station, the delivery station having a plurality of lockable compartments operable by check means, and the supervisory station having means for storing a plurality of such check means, but releasing a respective single check means only upon an article in an associated compartment being made available to a preceding patron.

A further object of this invention is the provision of means for controlling the accessibility to articles in compartments and for controlling the availability of check means which control the access to such compartments.

Further and still other objects of this invention will be more fully understood by reference to the following description when taken in conjunction with the accompanying drawings, in which:

FIGURE 1 is an elevational view, partly in section, of the main elements comprising the supervisory station of the article delivery system;

FIGURE 2 is a plan view of typical checks which are usable with the system;

FIGURE 3 is a sectional view along line 3—3 in FIGURE 2;

FIGURE 4 is an enlarged view of a portion of the typical dispensing mechanism in FIGURE 1;

FIGURE 5 is a front elevational view of the article delivery station, specifically a view of the array of the service compartment means;

FIGURE 6 is a rear view of FIGURE 5;

FIGURE 7 is an enlarged view of certain portions per FIGURE 5;

FIGURE 8 is an elevational view, in section, of a typical compartment;

Figure 9:
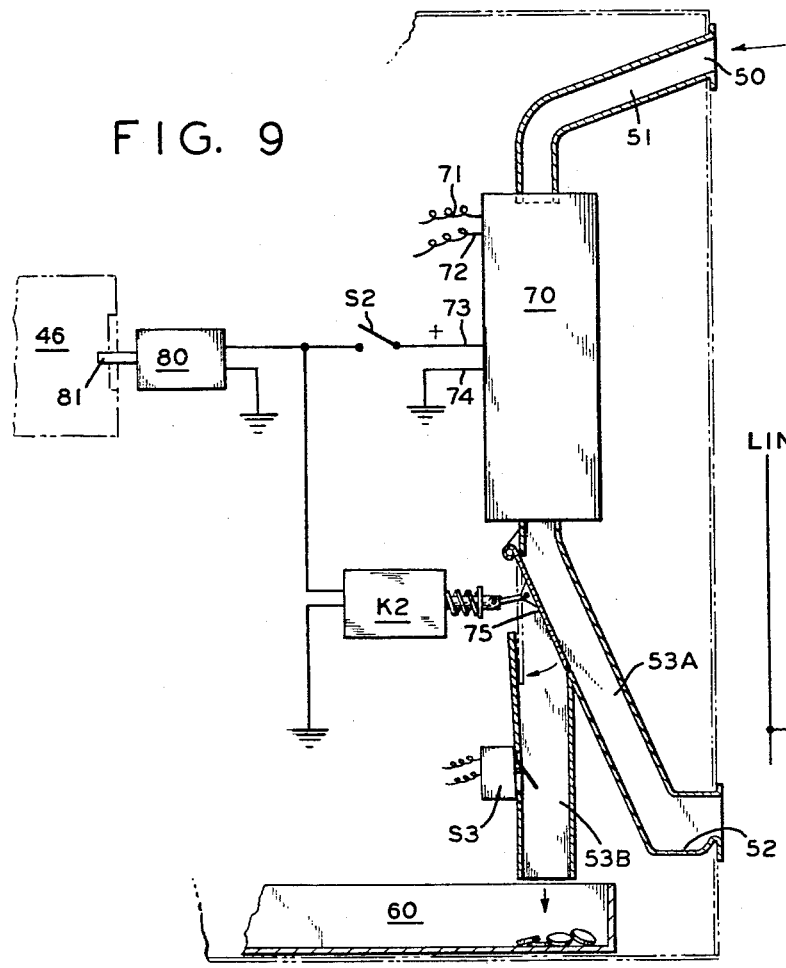
FIGURE 9 is a view, partly schematic, of the check deposit means and the associated elements.

As used hereafter "check" or "check means" shall mean any suitbale key, token, device or instrumentality which is adapted to cooperate with an article withdrawal control means or a lock means for providing operation thereof and such operation, in turn, enabling access to an article stored in a compartment.

Referring now to the figures and FIGURES 1–4 in particular, a supervisory station 12 is shown which includes a check storage and dispensing means 14 and an attendant 16. The attendant is provided in the operation to be described hereafter, but may be replaced by fully automated order ticket reading, and money computing and acceptance means. The function of the supervisory station is to enable a patron to order an article, preferably by means of an ordering ticket, pay for such article, and receive a check for use in connection with a normally locked compartment, the latter being disposed possibly at a distance from the supervisory station. The check issued at the supervisory station enables the patron to operate the compartment which will house the article so ordered.

The check storage means 14 includes an enclosure 16 housing a plurality of vertical storage tubes 18. Each such tube is adapted to be provided with a specific category of checks, e.g. 20A, 20B, etc. Each particular check is adapted to open a certain compartment which will be described later. For instance, check 20A is adapted to open the compartment numbered "1," check 20B to open the compartment numbered "2," etc.

Each storage tube is fitted at its lower end with a release means, such as solenoid K1 acting via an apertured slide 22 upon the stack of checks 20A stored in the leftmost tube 18. Each actuation of an appropriate solenoid K1, although only one is shown in FIGURE 1, dispenses one of the respective checks, the check being released from the bottom of the stack. A dispensed check drops by gravity into the funnel 24 and comes to rest at a slotted opening 26, thereby being rendered accessible to a patron.

It will be appreciated that several checks may be disposed there in the sequence in which they have been released from the storage tubes. As shown, a single check 20A' has been rendered accessible to a patron for removal therefrom.

The check means, in a typical example illustrated herein, see FIGURES 2 and 3, comprise coin-like elements. Each check is a plastic body 20A, 20B, 20C, or 20D, having embedded therein one or more metal bodies, such as the respective metal bodies 31, 32 and 33 in the checks numbered "1," "2" and "3." A further variations is illustrated by the check numbered "4," plastic body 20D, which has, for instance, four small metal bodies 34 embedded. The "loading" of the checks, i.e. weight and metallic composition, provides the differences between the checks, the system used being similar to the denomination of ordinary coin money. Hence, the loading of the checks categorizes the checks and provides the association with a respective article delivery compartment. The numerals "1," "2," "3," "4," etc. molded into the surface of the respective plastic bodies readily provide the correct identification for each check.

The article delivery station, identified by numeral 38, comprises essentially an array of compartments 40 supported on a platform 42. As shown in FIGURES 5 and 6, there are illustrated only four compartments, but it will be apparent that more compartments may be present. The compartments, as stated heretofore, may be remote from the supervisory station and associated with an article preparation station (not shown). Each compartment, such as the compartment 44, is a rectangular, box-like structure having a hinged door 46. The hinge 45 incorporates a spring to return the door when opened to its position on the compartment. Each door has an identification numeral which matches with a respective check category described heretofore, FIGURES 2 and 3. Additionally, each door is provided with a handle or knob 48 for grasping the door.

As seen from the front, FIGURE 5, each compartment housing is associated with a check acceptance means which includes a slot 50 adapted to receive therein a respective check. If a deposited check is rejected, it reaches a reject tray 52 from which a patron may remove the rejected check, the patron thereby regaining possession of the check. The check is rejected if it is of the improper category, or if of the proper category, an article has not been delivered to the particular compartment, i.e. the article is not ready for withdrawal from a respective compartment. The door of each compartment acts as an article withdrawal control means, but other means, such as a movable gate overlying the compartment opening may be used also. An accepted check, instead of reaching the reject tray 52, is passed to an acceptance position comprising a locked drawer 60, which is inaccessible to a patron, but from which accepted checks may be removed by a properly authorized agent having access to the rear of the array. The accepted checks may be removed, for instance, at the end of the day, and then reinserted in the respective storage tubes 18 disposed at the supervisory station 12.

FIGURE 6 shows the rear view of the array compartments, depicting clearly the hinged doors 62 of the locked drawer 60, incorporating locks 64, by which an authorized agent gains access to the accepted checks. As seen also in this figure, the article receiving compartments 44 are open from the rear in order that an attendant, filling an order, can deposit therein the filled order, e.g. a meal comprising several dishes of food supported on a serving tray. Alternatively, automatic article delivery means may be used for delivering the appropriate article to the compartment as described for instance in my copending application for U.S. Letters Patent Ser. No. 529,556 filed Feb. 23, 1966, entitled "Article Delivery System," now U.S. Patent No. 3,339,671 dated Sept. 5, 1967. The appropriate compartment number applicable to an order quite readily may be indicated on the order slip, having been marked thereon by the attendant 16 or, if the checks are made with raised lettering, such lettering is usable for embossing or imprinting the order slip with the appropriate number by the use of a standard apparatus.

Figure 10:
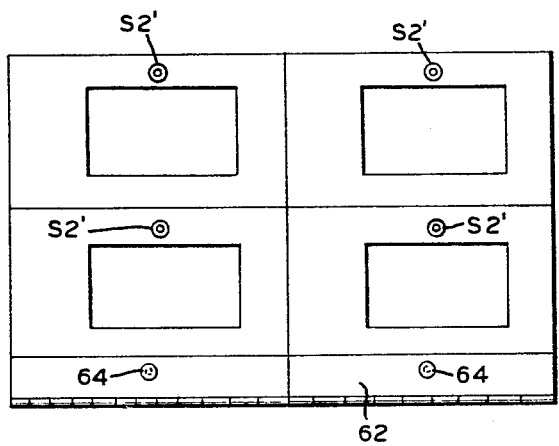
FIGURE 10 is a view similar to FIGURE 6, but showing a modification.

FIGURE 8 depicts a cross section through a typical compartment. It includes a spring supported platform 66 upon which a tray or article 68 may be deposited. The weight of the article 68 causes the platform 66 to descend, actuating the stationary switch S2. The actuation of the switch S2 denotes that an article has been deposited in the respective compartment and this, in turn, influences the check acceptance and testing means, as will be described later. Alternatively, as illustrated in FIGURE 10, a manually operable switch S2 may be provided in association with each compartment, which switch is operated by the attendant at the time the order is placed into the respective compartment. The switch, if of the push button type, operates a holding relay, the circuit of which is broken in response to the withdrawal of the deposited article.

FIGURE 9 shows the arrangement of the check acceptance means. A check deposited at the slot 50, which is exposed to a depositer facing the array of compartments, is passed by the chute 51 to a check testing means 70 of the type usually provided in coin controlled vending machines. This means may be either a completely mechanical device, an electrical device, or a combination thereof. Typically, such a device tests for the diameter, weight, magnetic character, and other physical and metallurgical properties of the check means. It will be understood that the testing means 70 tests each deposited check for its acceptability in connection with a particular compartment and rejects all other checks. For instance, in FIGURE 9 the testing means 70, being associated with the compartment "3," FIGURE 5, would be adjusted to find solely a check of category "3," FIGURE 2C, acceptable and reject all other checks.

Figure 11:
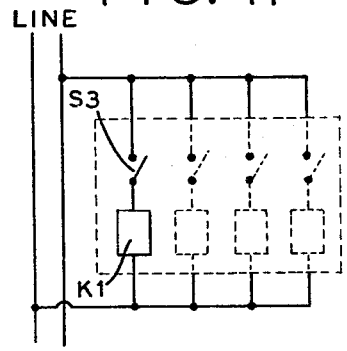
FIGURE 11 is a schematic electrical circuit diagram showing the interconnection between certain switches at the article delivery station and control means at the supervisory station.

As indicated, the check testing means 70 is of the electromechanical kind, receiving input power at terminals 71 and 72 and providing an output signal at the conductors 73, 74 when a check tests "acceptable." A check, after having passed through the testing means 70, passes either via the chute 53A to the reject tray 52, or via the chute 53B to the drawer 60. A pivoted vane 75 coupled to a solenoid K2 normally passes deposited checks to the reject tray 52. When a check of the proper type is deposited, a signal is provided across the conductors 73 and 74, and if switch S2 is closed, denoting the presence of an article in the compartment, the relay K2 is energized, thus causing the retraction of the vane 75 and causing the deposited check to reach via the chute 53B the locked acceptance means 60. Also the electrically operated compartment door lock 80 is operated to cause the withdrawal of the bolt 81, thereby enabling the patron to open the door 46 and obtain access to the article deposited in the compartment. A reset switch (not shown) actuated by the opening of the door 76 may be used to normalize the circuit again. A switch S3 is disposed in the check acceptance branch chute 53B and is momentarily actuated by a check passing therethrough on its way to the drawer 60. This switch S3 is interconnected, FIGURE 11, with a respective solenoid K1 of the coin storage tubes, FIGURE 1, to cause the release of a new check for use by a subsequent patron. Thus, only a single check operating each one of the compartments is available for use, or, so to speak, in circulation at any one time.

In an alternative embodiment the switch S3 may be disposed to be actuated by the opening of the door 46, denoting that the article is being removed from the compartment. Similarly, the switch S3 may be interconnected with a motion responsive switch sensing the upward motion of the platform 66, thus indicating the removal of the article. This latter variation is particularly useful when the motion responsive switch is connected in series with a limit switch denoting the open position of the door, thus ascertaining the condition that the delivered article is removed by the patron, yet permitting the removal of the article from the service side without causing the issuance of a new check at the supervisory station.

In summary then, as a patron uses the present article delivery system he encounters first the supervisory station illustrated in FIGURE 1. At this station, he prepares an ordering ticket on which he notes certain articles which he wishes to receive. The patron then presents this ticket to the attendant 16, pays for his selection and receives from the attendant a check or takes the lowermost check 20A′. The check identifies a particular compartment which has been designated to receive the particular articles ordered. The compartment designation may be noted on the ordering ticket by the attendant or by an imprinting means. Meanwhile, the attendant 16 passes the ordering ticket to other personnel who fill the order, or, in automated systems, the order is filled automatically and deposited in the appropriate compartment. The patron subsequently goes to his assigned compartment which may be located quite remote from the supervisory station. Finding the appropriate compartment, the patron inserts the check in the associated slot 50, FIGS. 5 and 7. If the check is not the correct one, of if the order has not been deposited in the respective compartment, the check reaches the reject chute 52. If, however, the check is associated with the respective compartment and the order has been deposited, the check will cause operation of the associated lock 80 and the check is conveyed to the acceptance means 60 where such check is stored safe from surreptitious removal. The acceptance of the check and the attendant removal of the ordered articles from the respective compartment provides for the use of the very same compartment by a succeeding customer. In order to accomplish this, the acceptance of the check causes a responsive control action, such as the operation of the associated switch S3 which releases a check of the same category from the check storage and release means by operating the appropriate relay K1, FIGURE 1. Therefore, while there is available a supply of like checks, only a single one is available at any one time for operating a respective compartment. The second check is not available until the first check has been deposited in conjunction with access to the compartment. It will be apparent that in order to start the entire system, for instance at the beginning of the day, one of each respective checks 20A, 20B, 20C, 20D must be available at the opening 26 of the supervisory station or must have been provided to the attendant 16.

While there have been described and illustrated certain preferred embodiments of my invention and several additional modifications have been indicated, it will be apparent to those skilled in the art that many further changes and modifications may be made therein without departing from the broad intent and scope of my invention.

What is claimed is:
1. In an article delivery system the combination of:
a supervisory station having check storage and release means for storing and releasing checks adapted to coact with an article delivery station;
said article delivery station comprising:
(a) compartment means for receiving an article which is adapted to be withdrawn therefrom in exchange for the deposit of a check;
(b) article withdrawal control means operatively associated with said compartment means for precluding the withdrawal of an article from said compartment in the absence of the deposit of a check and for causing said withdrawal means to be conditioned for the withdrawal of an article in response to such deposit;
(c) check deposit means for receiving a check and causing such check to be conducted to an acceptance means which retains such check safe from surreptitious removal;
(d) means for denoting the presence of an article in said compartment means;
(e) control means coupled to said means for denoting the presence of an article, to said article withdrawal control means, and to said check deposit means for causing responsive to the presence of an article in said compartment said withdrawal control means to be conditioned for the withdrawal of the article and a check deposited in said deposit means to reach said acceptance means, and
additional means coupled to said check deposit means and to said check storage and release means for releasing a check from said check storage means in response to a check received by said check deposit means being conducted to said acceptance means.

2. In an article delivery system as set forth in claim 1 wherein said supervisory station and said article delivery station are remote from one another.

3. An article delivery system as set forth in claim 1, wherein said check deposit means includes also a check reject means, and said control means causes a check deposited in said check deposit means to be conducted to said reject means in the absence of an article in said compartment.

4. An article delivery system as set forth in claim 3 wherein said check deposit means includes means for testing an accepted check and conducting non-acceptable checks to said reject means.

5. An article delivery system as set forth in claim 1 wherein said checks comprise coin-like means.

6. An article delivery system as set forth in claim 1 wherein said additional means comprises a switch means.

7. An article delivery system as set forth in claim 1 wherein said article withdrawal control means comprises a door and includes a lock adapted to retain said door locked against said compartment, thereby rendering an article in said compartment inaccessible, and said control means is coupled to said lock for providing operation thereof responsive to the deposit of a check in said check deposit means and the presence of an article in said compartment means.

8. An article delivery system as set forth in claim 1 wherein said check storage and release means is adapted to accommodate different categories of checks; said delivery station has a plurality of compartment means and associated check deposit means; each check deposit means being responsive to a respective category of checks; and said additional means is coupled to said check storage and release means to release a respective check belonging to the category to which the respective check deposit means is responsive.

9. An article delivery system as set forth in claim 8 wherein said supervisory station and said article delivery station are remote from one another.

10. A cyclically operable article delivery system comprising:
a compartment means adapted to receive and store an article therein;
an article withdrawal control means including a lock associated with said compartment means for controlling access to an article in said compartment means;
a first control means coupled to said lock and including a means for denoting the presence of an article in said compartment means, and including also a check acceptance means for receiving a check; said first control means being adapted to assume a first condition in which said lock precludes access to an article in said compartment means and adapted to assume a second condition in which said lock provides access to the article responsive to the operation of said means denoting the presence of an article in said compartment and the deposit of a check in said acceptance means;

check storage and release means adapted to store and release a check for deposit in said acceptance means for causing thereby a succeeding operation of said lock, and a second control means coupled to said first control means and to said check storage and release means for providing for the release of a check from said storage means in response to said first control means being in said second condition.

11. A cyclically operable compartment as set forth in claim 10 wherein said check storage and release means is disposed remote from said compartment.

12. A cyclically operable article delivery system comprising:

a plurality of compartment means, each adapted to receive and store an article therein;

an article withdrawal control means including a lock associated with each of said compartment means for controlling access to an article in a respective compartment means;

a plurality of first control means, each coupled to one of said locks and each of said control means including a means for denoting the presence of an article in a respective compartment means, and including also a check acceptance means for receiving a check; each of said first control means being adapted to assume a first condition in which the associated lock precludes access to an article in an associated compartment means and to assume a second condition in which said associated lock provides access to the article responsive to the operation of said means denoting the presence of an article in the respective compartment means and the deposit of a respective check in said respective acceptance means;

a check storage and release means for storing and releasing checks which are associated with said respective check acceptance means and adapted to be deposited in said acceptance means, whereby to cause a succeeding operation of an associated lock, and a second control means coupled to each of said first control means and to said check storage and release means for providing for the release of a respective check from said storage means in response to an associated first control means being in its second condition.

References Cited

UNITED STATES PATENTS

| | | | |
|---|---|---|---|
| 1,936,515 | 11/1933 | Love | 194—4 |
| 1,987,835 | 1/1935 | Love | 194—4 |
| 2,464,737 | 3/1949 | Wellekens | 221—17 |
| 3,241,647 | 3/1966 | Moore | 194—10 |
| 3,237,745 | 3/1966 | Gerhart et al. | 194—10 |

WALTER SOBIN, *Primary Examiner.*